METHOD AND APPARATUS FOR COMMUNICATION AND STORAGE OF BINARY INFORMATION
Filed May 31, 1968

INVENTOR.
ROBERT C. FRANCHINI
BY John H. Holcombe
ATTORNEY

United States Patent Office 3,560,947
Patented Feb. 2, 1971

3,560,947

METHOD AND APPARATUS FOR COMMUNICATION AND STORAGE OF BINARY INFORMATION

Robert Chester Franchini, San Jose, Calif., assignor to International Business Machines Corporation, Armonk, N.Y., a corporation of New York Filed May 31, 1968, Ser. No. 733,475
Int. Cl. G11b 5/04, 5/44
U.S. Cl. 340—174.1 8 Claims

ABSTRACT OF THE DISCLOSURE

Method and apparatus for communication and storage of binary information on a medium having two separately identifiable waveforms or states and having a plurality of nearly uniform bit cells. Binary "ones" are transmitted in selected bit cells by writing a transition between the two states at the center of each such bit cell. Binary "zeroes" are transmitted in all other bit cells by writing a transition between the two states at the leading edge of only those of the "zero" bit cells not immediately following a bit cell having a transition therein. Separation of data is accomplished by viewing each bit cell and separating any transition detected at the center of a bit cell as a "one" and considering any other bit cell as a "zero."

BACKGROUND OF THE INVENTION

Field of the invention

The invention relates to methods and apparatus for pulse communications and more particularly to methods and apparatus for transmitting and detecting binary information on a medium exhibiting at least two separately identifiable states.

Description of the prior art

In pulse communication systems, such as radio or wire transmission of or data processing of digital information, the information signals may conveniently be represented in binary form wherein the signals comprise one or the other of two identifiable waveforms or states. Thus, common ways of representing the binary form of signals is as electrical on-off signals, dot-dash signals, or positive-negative signals.

For use in many communication and data processing systems, the binary information is represented by various combinations and/or timings of transitions between two stable states. This general type of representation is the nearly exclusive type employed for storage of binary information on magnetic tape or disks. The storage medium employed exhibits a hysteresis characteristic having two stable states comprising two directions of magnetic orientations of portions of the medium. A head writes on the medium by creating magnetic fields in one or the other of the two directions and switching the direction in accordance with the information to be written. Most such systems arbitrarily break up the recording medium into a plurality of imaginary equal length portions, called "bit cells," which serve as identifying boundaries for each binary "bit" (an individual "one" or "zero") of information. In communication systems, the "bit cells" are arbitrary equal time periods.

One such prior art system, called "phase encoding," writes a binary "one" as a positive signal for the first half of a bit cell and as a negative signal for the second half of the bit cell. A "zero" is written as a negative signal for the first half of a bit cell and as a positive signal for the second half. The binary information is thereby represented by the direction of the transition between the two signals at the center of each bit cell.

Another prior art system, called "double-frequency," writes a binary "one" as two transitions within a bit cell, one at the leading edge and the other at the center. A binary "zero" is written as a single transition at the leading edge of the bit cell. Hence, the binary information is represented by the number of transitions within a bit cell.

Both of these prior art arrangements require relatively high upper frequencies for a given amount of data. As the trend is toward higher efficiency in the packing of greater amounts of data into a limited space, these prior art arrangements are severely limiting.

A prior art attempt at reducing the high upper frequency required for a given amount of data is called "modified fm" encoding. This type of encoding represents a "one" by a single transition at the midpoint of a bit cell and a "zero" by a single transition at the leading edge of a bit cell. To reduce the highest frequency to below that of phase encoding or double-frequency, the recording of any transition is skipped in a bit cell of a "zero" immediately following a "one."

The modified fm representation of data by the exact position of a transition within a bit cell requires a very exact relationship between the timing of the data separation means and the incoming encoded data. The timing relationship is normally maintained by employed the "zero" pulses as clock signals and continually adjusting the timing relationship so that the clock signals are aligned with the timing of the leading edge of the bit cells of the separation means.

However, at high packing densities where the data bits are spaced closer together, "bit shift" adversely affects modified fm. As magnetically recorded transitions are brought closer together, a magnetic read head will detect both the transition over which it is passing, and the immediately preceding and following transitions, if they are close to the transition being read. Since the transitions alternate in direction, detection of a preceding or following transition subtracts in amplitude from the transition being read.

Further, if only one of the adjacent transitions is close to the transition being read, the subtraction is not symmetrical. Hence, the detection signal for the transition being read will be reduced only on one side, since the amount of subtraction is inversely dependent upon the distance between the transitions. The peak of the detection signal is hereby effectively shifted away from the closest adjacent transition. This is called "bit shift."

Bit shift may have a disastrous effect upon the separation of modified fm information by self-clocking detection circuitry. For example, if a plurality of "ones" are followed by three or more "zeroes," the first clock transition occurs one and one-half bit cells after the last "one" transition and the next clock transition occurs only one bit cell later. The next clock will therefore affect a bit shift on the first clock transition away from the next clock. Hence, the first clock transition encountered by the separation means after a series of "ones" is erroneously positioned. The incorrectly positioned clock bit may therefore be erroneously detected as a data bit. Hence, the self-clocking circuitry will assume that the detected bit is a late data bit rather than an early clock bit. The timing adjustment is thereby altered erroneously and the system is thrown out of proper timing relationship.

SUMMARY

An object of the present invention is to provide a method and apparatus for the accurate communication and storage of binary information at high data densities.

Briefly, the invention comprises the method of communicating binary information on a medium having two, separately identifiable states and divided into a plurality of bit cells of nearly uniform length. Binary "ones" are communicated in selected bit cells by writing transitions between the seperately identifiable states at the center of each such bit cell. Binary "zeroes" are communicated in all other bit cells by writing transitions between the separately identifiable states at the leading edge of only those of the other bit cells not immediately following a bit cell having a transition therein and by writing no transition in those of the other bit cells immediately following a bit cell having a transition therein.

DESCRIPTION OF THE PREFERRED EMBODIMENT

As pointed out in the description of the prior art, binary information may be represented by various combinations and/or timing of transitions between two separately identifiable or stable states. This type of representation has been found to be primarily advantageous for the storage of binary information on magnetic tape or disks. Magnetic tape or disks comprise a non-magnetic backing, at least one surface of which is coated with a magnetizable material. The magnetizable material employed exhibits a hysteresis characteristic having two stable states comprising two directions of magnetic orientation of individual portions of the material. A recording head writes on the magnetic material by creating a magnetic field while moving longitudinally with respect to the material. The magnetic field emanating from the head is in one or the other of the above two directions and transitions between the two states are obtained by switching the direction of the magnetic field in accordance with the information to be written. Such recording systems arbitrarily consider the longitudinal trace made by the recording head along the magnetizable surface as being arbitrarily broken up into a plurality of imaginary equal length portions, called "bit cells." The bit cells serve as identifying boundaries for each binary "bit" (an individual "1" or "0") of information.

Figure 1:
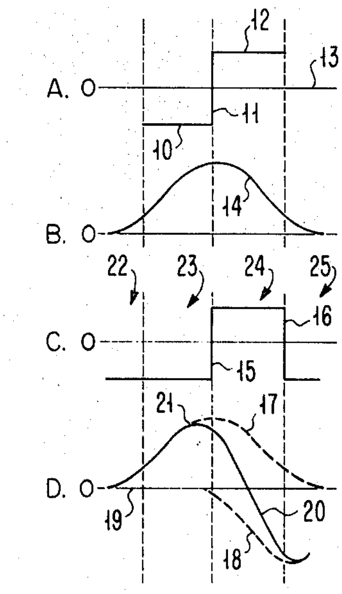
FIG. 1 illustrates communication signals present in certain prior art communications systems.

FIG. 1A is an idealized illustration of a recorded transition. The recording material is initially oriented in a first direction as shown by waveform 10. At some point, the material undergoes a transition 11 from orientation in the first direction to an orientation 12 in the opposite direction. The line 13 represents a net orientation of the magnetic material in neither direction. The magnetic fields emanating from the material recorded as shown in FIG. 1A, may be detected by a read head. A read head, however, detects more than just an infinitesimally sized portion of the magnetic material. The transition 11 is detected both substantially before and after the actual point at which the transition occurs. This detection is illustrated by FIG. 1B. The amplitude of the detection is inversely dependent upon the distance of the read head from the point of the transition. Hence, the waveform 14 representing the amplitude of the detection begins at a negligible value and increases until a peak occurs at the point of the transition 11. The amplitude of the detection the decreases from the peak until a negligible value is reached.

Where the transitions 11 are packed close together, this characteristic of magnetically recorded information has an adverse affect. This adverse affect is called "bit shift."

FIG. 1C illustrates the not uncommon situation of a transition 15 having a transition 16 closely spaced on only one side thereof. The detection of the recorded magnetic orientations by a read head is shown in FIG. 1D. The detection of transition 15 alone is shown by the waveform 17. Likewise, the detection by the read head of transition 16 alone is shown by waveform 18. However, the read head detects both transitions 15 and 16. The transitions being in opposite directions results in the amplitudes of the waveforms 17 and 18 being of opposite polarities from the zero voltage line 19. The resultant waveform from the detection of both transitions 15 and 16 is therefore the net difference between waveforms 17 and 18. This net difference is shown as waveform 20. The peak of waveform 20 is the indication to the system of the position of transition 15. But the peak has effectively been shifted to point 21, which is considerably removed from the actual position of transition 15. The effective shifting of the peak is called "bit shift."

The bit pattern of FIG. 1C is that representing the modified fm code of binary digits 1000 wherein bit cell 22 is a 1 and bit cells 23–25 are 0's. In high bit density recording, the resultant bit shift of the detected peak of transition 15 at point 21 may be sufficient to cause the peak 21 to be separated erroneously as a data, or 1 bit, rather than as a clock, or 0, bit. This erroneous detection is even more likely to occur in systems where the center 60% of the bit cell is utilized for detection of data bits and the remaining 40% of the bit cell is utilized for detection of clock signals.

The erroneous detection of peak 21 as a data bit can have an even more drastic effect upon the system than the erroneous detection itself. Modified fm detection systems normally clock from data bits as well as from clock bits so that clocking is maintained throughout a string of ones. If the clock is running slightly slower than the recording medium and needs a slight correction, it is more likely that shifted peak 21 will erroneously be separated as a data bit. The clocking circuitry will then detect it as a late data bit, rather than as an early clock bit. Therefore, the correction to the clocking circuitry will be to further slow down the clock. This instruction manifestly is the exact opposite of that required for proper operation of the clock.

The encoding method of the present invention is designed to avoid the difficulties encountered in a self-clocking code due to bit shift, and yet allow recording or transmission at high data densities.

Figure 2:
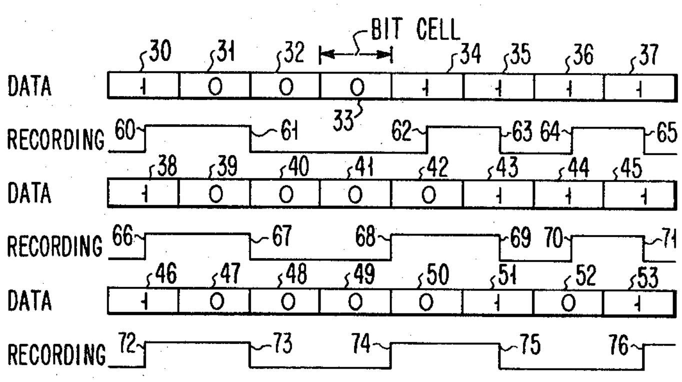
FIG. 2 illustrates the types of binary coded signals of the present invention.

FIG. 2 illustrates the recorded signal representing the associated binary data when recorded in accordance with the present invention.

The specific rules of the present invention to accomplish the recording shown in FIG. 2 are as follows. Binary ones are transmitted or recorded in selected bit cells by writing a transition between two states at the center of each such bit cell. Binary zeroes are transmitted in all other bit cells by writing a transition between the two states at the leading edge of only those of the zero bit cells immediately following a bit cell having no transition therein. Hence, no transitions are written in those of the zero bit cells immediately following a bit cell having a transition therein.

Application of these rules may now be illustrated by reference to FIG. 2. Bit cells 30–53 represent the 24 binary digits to be transmitted or recorded. The recording waveform 60–76 represents the 17 transitions resulting from the illustrated binary data.

Bit cell 30 has a binary significance of 1 and therefore requires that a transition 60 be written at the center thereof. Bit cell 31 comprises a binary zero and immediately follows bit cell 30 which has a transition recorded therein. Therefore, no transition is recorded in bit cell 31. Bit cell 32, however, represents a zero and immediately follows bit cell 31 which has no transition recorded therein. As a result, a transition 61 is recorded at the leading edge thereof. Bit cell 33, also a zero, follows bit cell 32 which does have a transition recorded therein and therefore no transition is recorded. Bit cell 34 is a one, requiring that a transition 62 be recorded at its center. Likewise, bits cells 35–38 are all ones, requiring that transitions 63–66 be recorded at the midpoints thereof.

Bit cell 39 is a zero and follows a bit cell having a transition, requiring that no transition be recorded. Bit cell 40 represents a zero and follows a bit cell not having a transition, requiring that transition 67 be recorded at the leading edge thereof. Bit cell 41 is a zero immediately following the bit cell having a transition and therefore no transition is recorded. Bit cell 42 is a zero following a bit cell without a transition so that transition 68 must be recorded at its leading edge. Bit cells 43–46 comprise ones, and thereby require that transitions 69–72 be recorded at the midpoints thereof. Bit cell 47 comprises a zero immediately following a bit cell with a transition and therefore is left unrecorded. Bit cell 48 is a zero immediately following an unrecorded bit cell and therefore requires the recording of a transition 73 at its leading edge. Bit cell 49 is a zero immediately following a bit cell having a transition, requiring that bit cell 49 be unrecorded. Bit cell 50 is a zero following an unrecorded bit cell and hence transition 74 is recorded at the leading edge thereof. Bit cell 51 is a one requiring the recording of a transition 75 at its midpoint. Bit cell 52, which is a zero, follows bit cell 51 which is recorded with a transition and hence remains unrecorded. Bit cell 53 is a one and therefore transition 76 is recorded at the midpoint thereof.

From the illustration in FIG. 2, it should be noticed that no clock transition is closely adjacent to another transition. Examples of the clock transitions are transitions 61, 67, 68, 73 and 74 from FIG. 2. Therefore, bit shift has no substantial effect upon any of the clock transitions and the position of detected peaks representing clock transitions may be relied upon as being exact. The detected peaks may therefore be relied upon to control the synchronism between clocking for the data separation circuitry and the recording medium, excluding possible phasing characteristics of the medium, head, and detection circuitry.

Figure 3:
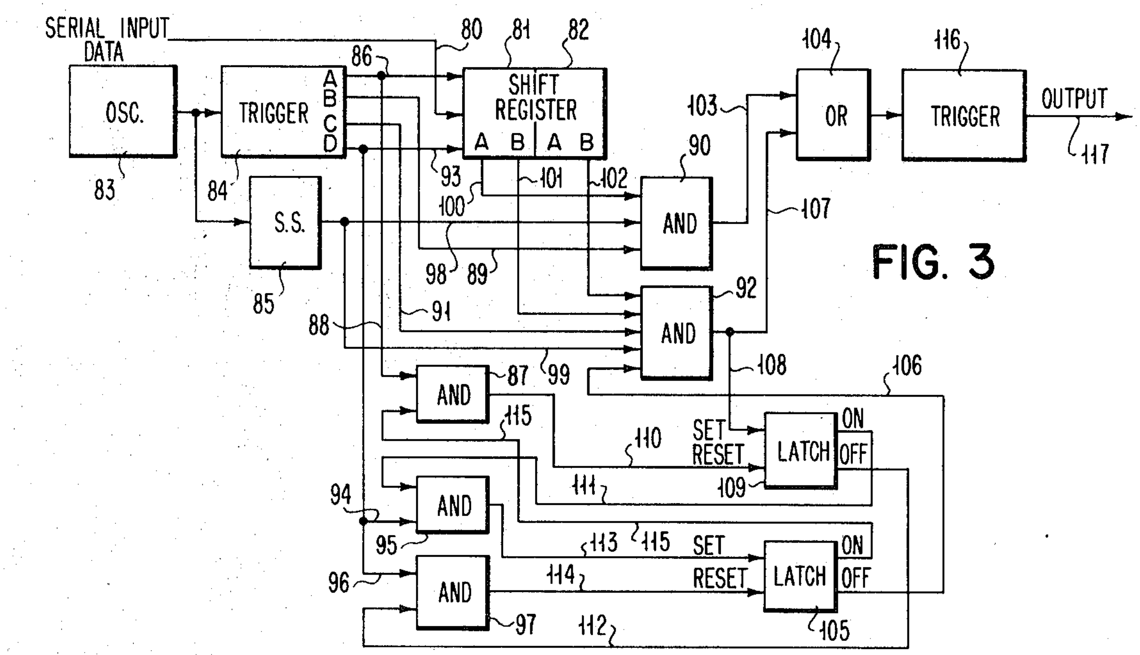
FIG. 3 is a schematic diagram of one embodiment of electric encoding circuitry constructed in accordance with the present invention.

FIG. 3 comprises an illustrative embodiment of circuitry for recording binary data in accordance with the rules illustrated in FIG. 2.

In FIG. 3, incoming binary data to be recorded or transmitted is applied serially to input line 80, which transmits the data to register 81 of shift register 81, 82. An oscillator 83 produces a square wave at a frequency such that two complete oscillations are undergone for each bit cell. The output of oscillator 83 is supplied to a trigger 84 and to single shot circuit 85.

Trigger 84 provides four separate outputs. Output A comprises a positive pulse for the first quarter of a bit cell and is supplied to shift register 81, 82 on line 86 and to AND circuit 87 on line 88. Output B comprises a positive pulse for the second half of a bit cell and is supplied on line 89 to one input of AND circuit 90. Output C of trigger 84 comprises a positive pulse for the first half of the bit cell and is supplied on line 91 to one input of AND circuit 92. Output D of trigger 84 comprises a positive pulse for the third quarter of the bit cell and is supplied on line 93 to shift register 81, 82, on line 94 to one input of AND circuit 95 and on line 96 to one input of AND circuit 97.

Single shot circuit 85 responds to the positive going transitions of oscillator 83 to provide short clock and data stroke pulses on line 98 to AND circuit 90 and on line 99 to AND circuit 92.

Each of the registers of shift register 81, 82 have A and B output terminals. The A output provides a positive signal when a 1 is contained in the register and the B output provides a positive signal when a 0 is in the register. The A output of register 81 is supplied on line 100 to AND circuit 90. The B output of register 81 is supplied on line 101 to AND circuit 92. The B output of register 82 is supplied on line 102 to AND circuit 92.

AND circuit 90 responds to a 1 in register 81, via line 100, and to timing signals from the B output of trigger 84 and from single shot 85, via lines 89 and 98, to transmit data, or 1, bits on line 103 to OR circuit 104.

AND circuit 92 is connected to the B output of register 81, the B output of register 82, the C output of trigger 84, the output of single shot 85, and the "off" output of latch 105, via line 106. Trigger 84 and single shot 85 thereby provide the timing to AND circuit 92 for transmitting a clock signal when registers 81 and 82 are both 0, and when latch 105 is off.

Serial input data is first applied to register 81 and then, under the control of trigger 84, shifted to register 82. Hence, the B output of register 82 to AND circuit 92 prevents transmission of a clock pulse for a zero data bit when it immediately follows a 1. As will be explained hereinafter, latch 105 blocks transmission of a clock pulse for a 0 which immediately follows a 0 which did transmit a clock pulse.

The clock pulses from AND circuit 92 are transmitted on line 107 to OR circuit 104 and also on line 108 to the "set" input of latch circuit 109. The output of AND circuit 87 appears on line 110 for application to the "reset" input to that latch circuit. The "on" output of latch circuit 109 is transmitted on line 111 to one input of AND circuit 95. The "off" output of latch circuit 109 is transmitted on line 112 to an input of AND circuit 97. The output of AND circuit 95 appears on line 113 as an input to the "set" input of latch circuit 105. The output of AND circuit 97 is transmitted on line 114 to the "reset" input of latch circuit 105. The "on" output of latch circuit 105 appears on line 115 to an input of AND circuit 87.

Assuming both latch circuit 105 and latch circuit 109 are initially off, a clock pulse appearing on line 108 from AND circuit 92 will set latch 109 on. The "on" output from latch 109 over line 111 then enables one input of AND circuit 95. This will occur at the leading edge of a bit cell. Later in the same bit cell, the D output of trigger 84 appears on line 94 and is gated by AND circuit 95 to line 113 to set latch 105 on. Setting latch 105 on terminates the signal on line 106 therefrom and thereby blocks AND gate 92 from gating another clock pulse.

The on output of latch 105 is transmitted by line 115 to thereby enable AND gate 87. At the beginning of the following bit cell, the A output of trigger 84 is transmitted on line 88 and gated by AND circuit 87 to line 110, thereby resetting latch 109 off. This terminates the signal on line 111 and thereby blocks AND gate 95. Simultaneously, a signal is transmitted from the off output of latch 109 over line 112 to thereby enable AND circuit 97. At the midpoint of that bit cell, the D output of trigger 84 is transmitted by line 96 and gated by AND circuit 97 over line 114 to thereby reset latch 105 off. This again provides an output on line 106 to enable AND circuit 92 to allow the transmission of a clock pulse on line 107 to OR circuit 104.

As described, latch 109 controls the operation of latch 105, and the off output of latch 105 controls the gating or blocking of clock pulses by AND circuit 92. Upon the transmission of a clock pulse by AND circuit 92 at the beginning of a bit cell, latches 109 and 105 are operated to turn off the signal on line 106 for the last half of that bit cell and the first half of the immediately following bit cell. The blocking of AND circuit 92 thereby spans the leading edge of the following bit cell, to thereby block an immediately following clock pulse. The latch circuits are reset after that time to allow the transmission of a clock pulse in the following bit cell, should a 0 appear in register 81.

Figure 4:
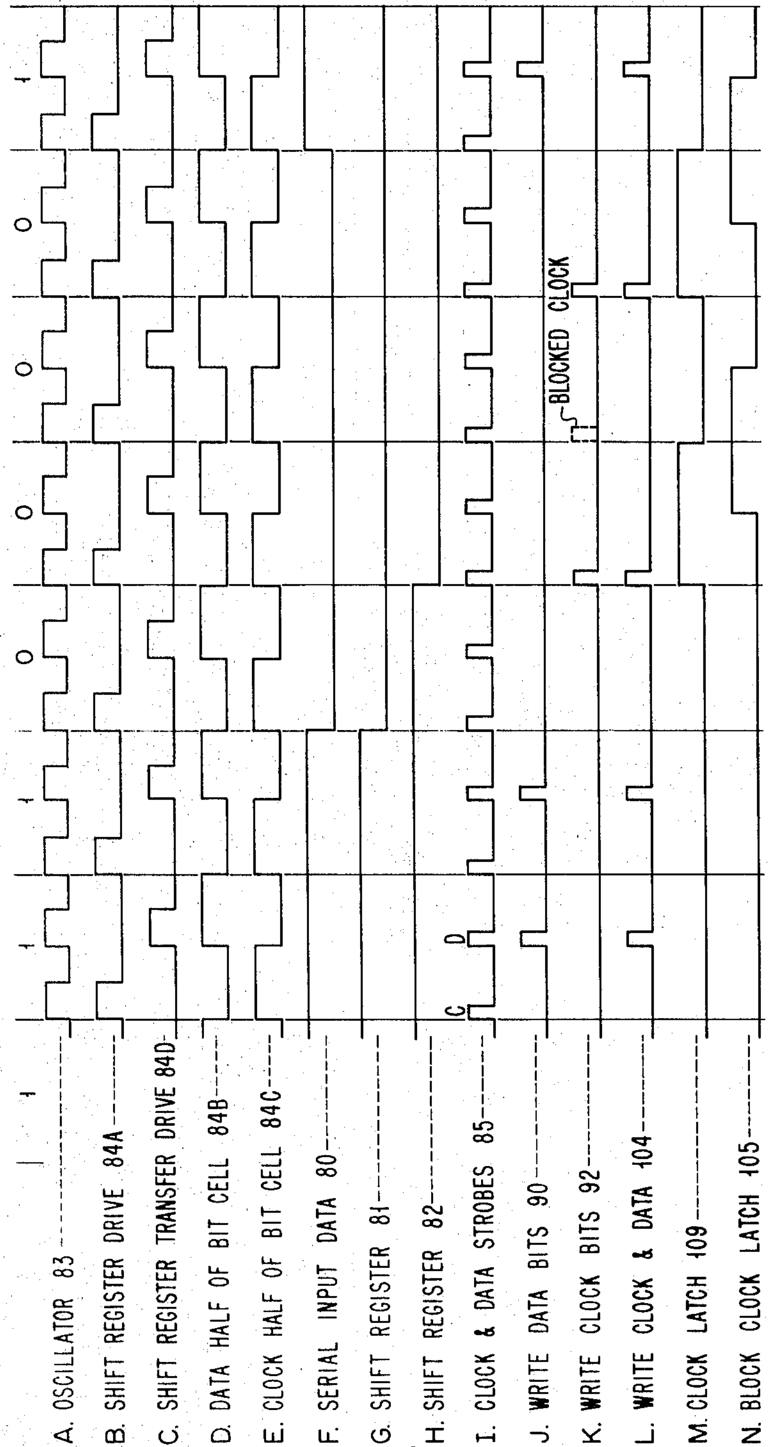
FIG. 4 is a waveform diagram showing illustrative timing and data signals present in the operation of the circuitry of FIG. 3.

The operation of the circuitry of FIG. 3 will now be described with respect to a string of data. The data is illustrated at the top of FIG. 4, and comprises the binary digits 11100001.

The initial 1 is considered to have already been entered in register 81 of shift register 81, 82.

At the leading edge of the next bit cell, the input line 80 is positive as shown by FIG. 4F, representing a 1, and oscillator 83 provides a positive pulse for the first quarter of the bit cell, as shown by FIG. 4A. The output of oscillator 83 is supplied to trigger 84 and to single shot 85. Trigger 84 responds by supplying the oscillator pulse at output A on line 86 to the shift register 81, 82, as shown by FIG. 4B. This shift register drive pulse causes the shift register to transfer the 1 in register 81 to register 82 and to then cause register 81 to respond ot the input on line 80 by assuming a binary significance of 1. Register 81 therefore supplies a signal on line 100 to AND circuit 90, as shown by FIG. 4G. At the same time, no signal is supplied on line 101 from shift register 81, thereby blocking AND circuit 92.

Single shot 85 responds to the output of oscillator 83 by supplying a short clock pulse on lines 98 and 99 to AND circuits 90 and 92, as shown by FIG. 4I. The lack of a data timing signal on line 89 prevents transmission of the clock pulse by AND circuit 90 and the absence of a signal on line 101 prevents the transmission of the clock pulse by AND circuit 92.

At the second oscillation of oscillator 83 beginning at the midpoint of the bit cell, trigger 84 supplies an output signal on line 93 for a quarter of the bit cell, as shown by FIG. 4C. This signal conditions the shift register 81, 82 for the subsequent transfer of the data in register 81 to register 82. Trigger 84 also responds to the oscillator by suplying a signal on line 89 for the second half of the bit cell, as shown by FIG. 4D. Now, both input lines 89 and 100 to AND circuit 90 have positive signals, thereby enabling the AND circuit. Single shot circuit 85 also responds to the second oscillation of oscillator 83 to provide a short data pulse on lines 98 and 99 to AND circuits 90 and 92. However, AND circuit 92 still remains blocked due to the lack of an input signal on line 101. AND circuit 90, however, is enabled and transmits the data pulse from line 98, via line 103 to OR circuit 104, as illustrated in FIG. 4J.

Hence, the recording circuitry of FIG. 3 has transformed the input data on line 80 having a binary significance of 1 into a short data pulse occurring at the midpoint of the bit cell. This pulse is transmitted by OR circuit 104 to trigger 116. The trigger responds by changing from one stable state to another. The output from the trigger on line 117 therefore appears as a transition from one stable state to another at the midpoint of the bit cell.

The following digit appearing at input 80 is also a 1, and the circuitry of FIG. 3 responds identically as before, thereby providing another data pulse at OR circuit 104, as shown in FIG. 4L. This pulse is again transmitted to trigger 116, causing the trigger to change back to its original state and thereby switch the signal appearing on output line 117 to the original state in the form of a transition at the midpoint of the bit cell.

The following digit to be provided on input line 80 is a 0, as is shown by the absence of a signal during the bit cell in the waveform of FIG. 4F. The oscillator 83 and trigger 84 operate as before, causing register 81 to transfer the 1 therein to register 82 and to then assume the value of the input data. Therefore, register 81 provides an output on line 101 to AND circuit 92 and drops the output on line 100 to AND circuit 90, as shown by FIG. 4G. As shown by FIG. 4H, shift register 82 remains on, thereby not providing an output on line 102. Hence, AND circuit 90 is blocked due to the lack of an input on line 100 and AND circuit 92 is blocked due to a lack of an input on line 102.

Single shot 85 acts as before, providing a clock at the leading edge of the bit cell and a data pulse at midpoint of the bit cell. These pulses are blocked by the two AND circuits so that no output is provided to OR circuit 104. This is shown by reference to FIGS. 4J, K and L. The trigger 116 therefore remains in the same state as does the output therefrom on line 117.

The immediately following bit provided on input line 80 is another 0. As before, oscillator 83 and trigger 84 act to cause the 0 in register 81 to be shifted to register 82 and to cause register 81 to assume the 0 provided on input line 80. Now, both registers are in the 0 state, as shown in FIGS. 4G and H. Therefore, no input is provided on line 100, thereby blocking AND circuit 90. Outputs, however, are provided on both lines 101 and 102 to AND circuit 92. Also, latch 105 is off as shown by FIG. 4N and thereby provides an output signal on line 106 to AND circuit 92. At the same time, the C output of trigger 84 is on for the first half of the bit cell, as shown by FIG. 4E. Single shot 85 responds to oscillator 83 as before, providing the clock pulse at the leading edge of the bit cell, as shown by FIG. 4I. Since the other four inputs to AND circuit 92 are all on, AND circuit 92 is enabled and therefore transmits the clock pulse appearing on line 99 from single shot 85 on line 107 to OR circuit 104. This is shown by reference to FIGS. 4K and L. The clock pulse thereby causes trigger 116 and output 117 therefrom to change state at the leading edge of the bit cell.

The clock pulse from AND circuit 92 also is transmitted on line 108 to latch 109, thereby setting the latch on. This is shown by reference to FIG. 4M. Turning latch 109 on, provides an output on line 111 to thereby enable AND circuit 95.

At the midpoint of the bit cell, output C from trigger 84 on line 91 turns off, thereby blocking AND circuit 92 from transmitting the data pulse from single shot 85. At the same time, output D from trigger 84, as shown in FIG. 4C, is transmitted on line 94 through enabled AND circuit 95 and line 113 to thereby set latch 105. This is shown in FIG. 4N. Therefore, the output from the latch on line 106 terminates, thereby additionally blocking AND circuit 92. Also, the latch now provides an output on line 115 to AND circuit 87, thereby enabling that circuit.

In the next bit cell, another 0 is provided on input line 80. The oscillator 83 and trigger 84 operate as before causing the shifting of the 0 in register 81 to register 82 and the insertion of the new 0 in register 81. The output A of trigger 84 is also transmitted on line 88, through enabled AND circuit 87, 87 on and line 110 thereby to reset latch 109, as shown by FIG. 4M. Resetting the latch terminates the signal on line 111, thereby disabling AND circuit 95. The latch now provides an output signal on line 112 to enable AND circuit 97.

However, latch 105 remains set on. Therefore, no output is provided on line 106 and AND circuit 92 is blocked. The clock pulse from single shot 85 is therefore blocked from transmission to OR circuit 104, as shown by FIGS. 4I, K and L. Trigger 116 and the output therefrom on line 117 thereby remains unchanged.

At the midpoint of the bit cell, output D of trigger 84, shown in FIG. 4C, is supplied over line 96, enabled AND circuit 97, and line 114 to thereby reset latch 105 off. Resetting the latch off terminates the signal on line 115 to thereby disable AND circuit 87. The latch now provides an output signal on line 106 to AND circuit 92. The transmission of a data bit by AND circuit 92 is blocked, however, due to the termination of clock timing output C from trigger 84 on line 91, as shown by FIG. 4C.

In the following bit cell, another 0 is provided on input line 80 and inserted in register 81, as the previous 0 is shifted to register 82. Again, outputs are provided on lines 101 and 102 to AND circuit 2 for the duration of the bit cell, and an output is provided on line 91 from terminal C of trigger 84 for the first half of the bit cell. Hence, since a signal is also provided on line 106 to the AND circuit, the AND circuit transmits the clock pulse from single shot 85 to OR circuit 104, as shown by FIGS. 4K and L. Therefore, trigger 116 and output 117 are caused to change state at the leading edge of the bit cell.

The clock pulse transmitted by AND circuit 92 also appears on line 108 to thereby set latch 109 on, as shown by FIG. 4M. This causes the signal on line 112 to be terminated to disable AND circuit 97, and also causes the signal to appear on line 111 to thereby enable AND circuit 95. At the midpoint of the bit cell, output D of trigger 84 appears and is transmitted by line 94, enabled AND circuit 95, and line 113 to thereby set latch 105 on, shown in FIG. 4N. Therefore, the output on line 106 is terminated, thereby blocking AND circuit 92 from the transmission of another clock pulse. Also, an output is provided on line 115 to thereby enable AND circuit 87.

In the last bit cell, a 1 is provided to register 81, and the 0 previously in register 81 is shifted to register 82. Therefore, the output from register 81 on line 101 to AND circuit 92 is turned off, thereby additionally blocking AND circuit 92. Therefore, no clock pulse is transmitted to OR circuit 104. At the same time, output A from trigger 84 appears on line 88 and is transmitted via AND circuit 87 and line 110 to thereby reset latch 109 off, shown by FIG. 4M.

The 1 stored in register 81 causes an output to appear on line 100 to enable AND circuit 90. At the midpoint of the bit cell, output B from trigger 84 on line 89 additionally enables the AND circuit so that the data pulse from single shot 85 is transmitted thereby to OR circuit 104, causing trigger 116 and output 117 to change state at the midpoint of the bit cell.

Resetting latch 109 off provided an output on line 112 to thereby enable AND circuit 97. At the midpoint of the bit cell, output D from trigger 84 is thereby transmitted by line 96, AND circuit 97 and line 114 to thereby reset latch 105 off, as shown in FIG. 4N.

The latches 105 and 109 are thus both reset off so as to be ready to react to the next clock pulse provided on line 108 so as to block an immediately subsequent 0 if provided.

The circuitry including latches 105 and 109 may therefore be described as clock blocking circuitry which is reset back to an initial condition during a bit cell in which either a 0 is provided and the clock pulse blocked, or a 1 is provided and the data pulse transmitted.

The circuitry shown in FIG. 3, thereby operates in accordance with the described rules to provide a signal for recording or transmitting on output line 117 which corresponds to the subject invention. This circuitry is exemplary of various embodiments which may be devised to operate in accordance with the described rules.

Figure 5:
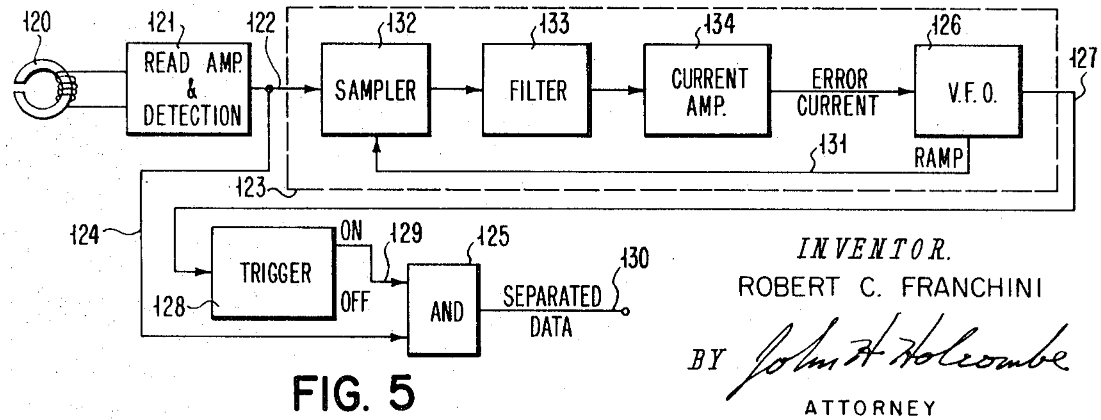
FIG. 5 is a schematic diagram of an embodiment of data separation circuitry for separating data encoded by the circuitry of FIG. 3.
Figure 6:
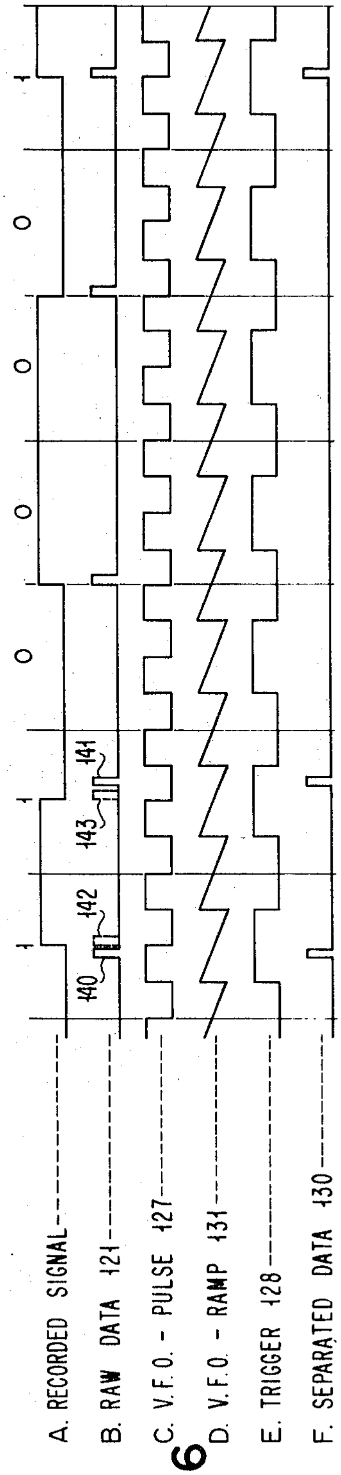
FIG. 6 is a waveform diagram showing illustrative timing and data signals present in the operation of the circuitry of FIG. 5.

An example of circuitry to detect and separate the data recorded or transmitted by the circuitry of FIG. 3 is illustrated in FIG. 5. For the purpose of illustration, it is assumed that the waveform to be detected is the recorded signal shown in FIG. 6A.

The recorded signal is detected by a read head 120 and supplied to a read amplifier and detection circuit 121. The read amplifier and detection circuit 121 filters out low amplitude noise signals and responds to the transitions of the recorded signal as detected by read head 120 to provide a narrow positive-going pulse at the point of each such transition. The output of read amplifying and detection circuit 121 is shown in FIG. 6B. This output is called raw data and is supplied on line 122 to clocking control circuit 123, and on line 124 to AND circuit 125. Clocking control circuit 123 responds to the exact position of the detected transitions with respect to bit cell boundaries as defined by a variable frequency oscillator 126. The clocking correction circuitry adjusts the frequency of the VFO when necessary to maintain the clocking output signals of the VFO in synchronism with the bit cells of the detected transitions.

The clocking signals from VFO 126 are provided on line 127 to a trigger 128. The trigger responds to the VFO output on line 127 to change state upon receipt of a positive-going transition from the VFO. The trigger thus effectively divides the VFO output frequency by two and supplies on line 129 a positive signal for the middle half of the bit cell. This signal is applied to AND circuit 125 and enables the AND circuit for that period. The AND circuit is thus enabled for the middle one-half of the bit cell, which is the time at which data pulses representing a binary 1 occur. These pulses are transmitted by AND circuit 125 to separated data output 130.

The clocking control circuit 123 includes the VFO 126, a ramp output 131 from the VFO shown in FIG. 6D, a sampler 132, a filter 133, and a current amplifier 134. The ramp output 131 of the VFO operates in synchronism with the pulse output 127 therefrom. As shown in FIG. 6D, the ramp output 131 comprises a vertical transition from negative to positive polarity, followed by a gentle, linearly sloped transition from positive to negative polarity.

If the XFO is exactly synchronized with the incoming bit cells, the midpoints of the sloped VFO ramp signals would be exactly aligned with the midpoints and borders of the bit cells. To continually test the synchronization, the VFO ramp output and the incoming raw data are supplied to sampler 132. The sampler responds to incoming raw data to transmit to filter 133 the instantaneous voltage of the ramp at the time the raw data pulse is received. Hence, if a raw data bit is received at exactly the midpoint of the ramp, the sampler provides a 0 output voltage.

If, however, raw data bit arrives slightly before the midpoint of the ramp, the sampler provides a small positive voltage. The further the raw data bit precedes the midpoint of the sloped ramp signal, the greater is the voltage output of the sampler 132. Similarly, if the raw data bit is received by the sampler after the midpoint of the sloped ramp signal, a negative voltage is supplied to filter 133. Filter 133 smoothes the output of sampler 132 so that no sudden changes occur, and supplies the smoothed signal to current amplifier 134. Current amplifier 134 responds to the smoothed output of filter 133 and supplies an error current corresponding to the voltage of the filter 133 to control the frequency of VFO 126. VFO 126 is arranged to speed up in response to a positive error current from current amplifier 134 and to slow down in response to a negative error current.

Hence, a difference between the time of receipt of a raw data bit in the midpoint bit of the sloped portion of the VFO ramp signal is linearly translated into a voltage by sampler 132, converted into a current by current amplifier 134, and supplied to VFO 126 to change the speed of the VFO so that the VFO gradually moves into more exact synchronism with the bit cells of the received recorded signal.

The operation of the circuitry of FIG. 5 in response to detection of the recorded signal of FIG. 6A by read head 120 will now be described. The recorded signal of FIG. 6A has the binary significance comprising 1100001. The first two transitions detected by read head 120 lie at a distance from each other of one bit cell. Therefore, upon detection by read head 120 and conversion by read amplifying and detection circuitry 121 to the raw data of FIG. 6B, the raw data bits 140 and 141 will be the subject of bit shift. As discussed with respect to FIG. 1, bit shift causes the point of detection of closely spaced transitions to be shifted away from each other. This is shown in FIG. 6B by the positions of raw data pulses 140 and 141 with respect to the actual positions of the transitions illustrated by phantom bits 142 and 143.

The detected raw data pulses are supplied on line 122 to clocking control circuit 123 and on line 124 to AND circuit 125. The detected raw data bit 140 operates sampler 132 slightly before the midpoint of the received sloped ramp signal of FIG. 6D. This causes the sampler to provide a slight positive output to filter 133, which is transmitted to current amplifier 134 and converted into a small positive error current. This causes the VFO to slightly increase its frequency of operation, although this increase is insufficient to show in FIG. 6. In the next bit cell, the received bit 141 appears slightly after the midpoint of the ramp signal of FIG. 6B. This causes the sampler 132 to provide a slightly negative output to filter 133. The filter smoothes the resultant signal, thereby causing a gradual change in output to a negative value and supplies this output to current amplifier 134. The current amplifier responds by supplying an error current to the VFO corresponding to the voltage output of filter 133. This current causes the VFO 126 to gradually decrease its frequency of operation. Again, this change in speed is insufficient to show in FIG. 6.

The VFO pulse output of FIG. 6C is supplied on line 127 to trigger 128. This signal causes the trigger 128 to change state upon receipt of each positive going transition from the VFO. The trigger thus switches on and off in accordance with FIG. 6E.

Hence, at the beginning of the second quarter of the first bit cell, a positive going transition from VFO 126 on line 127 causes trigger 128 to switch on. This provides a positive signal on line 129 to thereby enable AND circuit 125. Just before the midpoint of the bit cell, the raw data bit 140 appears on line 124 and is transmitted by the enabled AND circuit to separated data output 130, as shown in FIG. 6F.

At the beginning of the fourth quarter of the bit cell, VFO 126 again provides positive going transition on line 127, thereby turning trigger 128 off. This terminates the signal on line 129 and disables AND circuit 125.

The same thing happens in the following bit cell, thereby gating raw data bit 141 to separated data output 130. No raw data bit appears in the following bit cell; hence, no data pulse is supplied at output 130.

Since trigger 128 is off at the beginning of the next bit cell, as shown by FIG. 6E, the clock bit appearing on line 124 is blocked by AND circuit 125. Therefore, no clock signal is allowed to appear at separated data output 130.

In the following bit cell, no raw data bit appears. Therefore, the signal at separated data output 130 remains unchanged.

Again, the raw data clock pulse appearing at the beginning of the next bit cell is blocked by AND circuit 125 to leave output 130 unchanged.

The following raw data bit represents a 1 and appears at the midpoint of the bit cell. AND circuit 125, having been enabled by trigger 128, transmits the data bit to separated data output 130.

Therefore, the circuitry of FIG. 5 has operated to block the transmission of clock pulses as separated data, and has transmitted all data bits, which represent 1's. In the resultant output signal, any positive pulse in a bit cell represents a binary 1, and those bit cells not having a positive pulse therein represent 0's. In this manner, the circuitry of FIG. 5 detects and separates the recorded signal to correct the speed of the detection circuitry in a self-clocking manner, and to then provide the separated data at an output.

Various other types of circuitry may be employed or devised to operate on the received recorded signal as shown in FIG. 6A similarly to the circuitry of FIG. 5.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for processing binary information for communication on a medium having two, separately identifiable states comprising:

a source of binary information;

clocking means for forming a plurality of bit cells of nearly uniform time duration; and logic means responsive to said binary information from said source and to said clocking means to provide an output on said medium such that one bit of binary information is communicated in each of said bit cells, said output responding to those of said bits of one binary characterization by providing a transition between said separately identifiable states at the midpoint of each corresponding bit cell, and responding to those of said bits of the other binary characterization by providing a transition between said separately identifiable states at the leading edge of only those of the corresponding bit cells which immediately follow a bit cell having no transition therein and by providing no transition in those of said corresponding bit cells which immediately follow a bit cell having a transition therein.

2. The apparatus of claim 1 wherein said logic means additionally comprises:

storage means for indicating whether the output provided for the immediately preceding bit cell contained a transition therein; and blocking means responsive to said storage means for preventing the occurrence of output transitions in those of said bit cells corresponding to said other binary characterization which immediately follow a bit cell having a transition therein.

3. The apparatus of claim 2 additionally comprising:

detection means for recovering said binary information from said output by responding to said transitions to detect the boundaries of said bit cells and by responding to those of said transitions occurring at the midpoint of a bit cell to detect said one binary characterization in each such bit cell and to detect said other binary characterization in all other bit cells.

4. The apparatus of claim 1 wherein:

said medium comprises a magnetic recording medium which exhibits a hysteresis characteristic having two stable states of remanence; and said logic means additionally includes recording means which moves linearly with respect to said magnetic recording medium and responds to said transitions between said separately identifiable states of said output to record corresponding transitions between said stable states of remanence on said magnetic recording medium.

5. The apparatus of claim 4 wherein:

said clocking means is coordinated with the speed of relative motion between said recording means and said magnetic recording medium so that said bit cells appear to be of substantially uniform length along said magnetic recording medium.

6. The apparatus of claim 4 wherein:

said recording means comprises means for impressing a magnetic field upon said magnetic recording medium and means for causing relative linear movement between said magnetic field and said magnetic recording medium, said means for impressing said magnetic field is responsive to said transitions between said separately identifiable states of said output to reverse the direction of said magnetic field to thereby record corresponding transitions between said stable states of remanence on said magnetic recording medium.

7. The apparatus of claim 6 wherein said logic means additionally comprises:

storage means for indicating whether the output provided for the immediately preceding bit cell contained a transition therein; and blocking means responsive to said storage means for preventing the occurrence of output transitions in those of said bit cells corresponding to said other binary characterization which immediately follow a bit cell having a transition therein.

8. The apparatus of claim 7 additionally comprising:

detection means for recovering said binary information comprising sensing means for sensing from said magnetic recording medium said recorded transitions between said stable states of remanence, timing means responding to said sensed transitions to detect approximate boundaries of said bit cells, and means responding to detect those of said sensed transitions occurring at the midpoint of a bit cell as said one binary characterization and to detect said other binary characterization in all other bit cells.

References Cited

UNITED STATES PATENTS

| | | | |
|---|---|---|---|
| 3,323,115 | 5/1967 | Sims, Jr. | 340—174.1 |
| 3,377,583 | 4/1968 | Sims, Jr. | 340—174.1 |

BERNARD KONICK, Primary Examiner

V. P. CANNEY, Assistant Examiner

U.S. Cl. X.R.

346—74